(12) United States Patent
Schmidt et al.

(10) Patent No.: US 8,985,857 B2
(45) Date of Patent: Mar. 24, 2015

(54) BEARING UNIT FOR A TURBOCHARGER

(75) Inventors: Heiko Schmidt, Muehlhausen (DE);
Kurt Kirsten, Graz (AT); Peter Solfrank, Frensdorf (DE); Christopher Mitchell, St. Austell (GB)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/111,034

(22) PCT Filed: Mar. 12, 2012

(86) PCT No.: PCT/EP2012/054201
§ 371 (c)(1),
(2), (4) Date: Dec. 9, 2013

(87) PCT Pub. No.: WO2012/139830
PCT Pub. Date: Oct. 18, 2012

(65) Prior Publication Data
US 2014/0086731 A1    Mar. 27, 2014

(30) Foreign Application Priority Data

Apr. 13, 2011 (DE) .......................... 10 2011 007 250

(51) Int. Cl.
*F16C 27/00* (2006.01)
*F16C 33/60* (2006.01)
*F16C 33/66* (2006.01)
*F04D 29/056* (2006.01)
*F01D 25/12* (2006.01)
(Continued)

(52) U.S. Cl.
CPC ............ *F04D 29/056* (2013.01); *F01D 25/125* (2013.01); *F01D 25/162* (2013.01); *F01D 25/18* (2013.01); *F02C 7/06* (2013.01); *F16C 19/184* (2013.01); *F16C 25/083* (2013.01);
(Continued)

(58) Field of Classification Search
CPC ........................... F16C 27/045; F16C 2360/24
USPC ........... 384/473–476, 504–506, 512, 537, 99; 415/111–113, 229
See application file for complete search history.

(56) References Cited

U.S. PATENT DOCUMENTS 4,721,441 A    1/1988  Miyashita et al.
7,461,979 B2 * 12/2008 Mavrosakis .................. 384/512
(Continued)

FOREIGN PATENT DOCUMENTS

DE         952756       11/1956
DE        35 31 313      3/1986
(Continued)

*Primary Examiner* — Phillip A Johnson
(74) *Attorney, Agent, or Firm* — Davidson, Davidson & Kappel, LLC

(57) ABSTRACT

A bearing unit for a turbocharger, including a bearing housing extending in an axial direction and also including a bearing cartridge arranged within the bearing housing, wherein between the outer circumference of the bearing cartridge and the bearing housing there is formed an intermediate space with an oil film, and wherein the bearing housing has a supply bore formed for the supply of oil to the oil film. The bearing cartridge includes a rolling bearing, the outer cartridge ring of which is mounted in a freely rotatable manner in the oil film. A bearing unit for a turbocharger, the bearing cartridge of which includes a rolling bearing, the bearing outer ring of which is mounted in a freely rotatable manner in the oil film. By means of bearing units of such design, it is possible to ensure the secure mounting of a shaft even without a separate twist prevention device.

10 Claims, 5 Drawing Sheets

(51) Int. Cl.
*F01D 25/16* (2006.01)
*F01D 25/18* (2006.01)
*F02C 7/06* (2006.01)
*F16C 19/18* (2006.01)
*F16C 25/08* (2006.01)
*F16C 27/04* (2006.01)

(52) U.S. Cl.
CPC ........... *F16C27/045* (2013.01); *F05D 2220/40* (2013.01); *F16C 2360/24* (2013.01)
USPC ............. 384/99; 384/475; 384/502; 384/504; 384/506

(56) References Cited

U.S. PATENT DOCUMENTS

2008/0019629 A1 1/2008 McKeiran
2012/0297770 A1 11/2012 Figler et al.

FOREIGN PATENT DOCUMENTS

| | | |
|---|---|---|
| DE | 10 2009 038 772 | 3/2011 |
| EP | 0339601 | 11/1989 |
| WO | WO 8200865 A1 * | 3/1982 |

* cited by examiner

BEARING UNIT FOR A TURBOCHARGER

The invention relates to a bearing unit for a turbocharger, comprising a bearing housing, extending in an axial direction, and a bearing cartridge which is arranged inside the bearing housing, wherein an interspace with a vibration-damping oil film is formed between the outer circumference of the bearing cartridge and the bearing housing, and wherein the bearing housing has a supply hole which is designed for the oil supply of the oil film.

Furthermore, the invention relates to a bearing unit for a turbocharger, comprising a bearing housing, extending in an axial direction, and a bearing cartridge, having an outer bearing ring and a carrier ring, which is arranged inside the bearing housing, wherein an interspace with a vibration-damping oil film is formed between the outer circumference of the outer bearing ring and the carrier ring, and wherein the bearing housing has a supply hole which is designed for the oil supply of the oil film.

BACKGROUND

A turbocharger customarily serves for the power augmentation of internal combustion engines by utilizing exhaust gas energy. For this purpose, the turbocharger consists of a compressor and a turbine which are interconnected via a shaft which is supported inside a bearing housing. During operation, the turbine is set in rotation by means of an exhaust gas flow and, via the shaft, drives the compressor which inducts and compresses air. The compressed air is directed into the engine, wherein as a result of the increased pressure during the induction cycle a large amount of air makes its way into the cylinder. As a result of this, the oxygen content which is required for the combustion of fuel correspondingly increases so that with each intake cycle more oxygen makes its way into the combustion chamber of the engine.

This leads to an increase of the maximum torque, as a result of which the power output, that is to say the maximum power at constant working volume, is increased. This increase especially allows the use of a more powerful engine with approximately the same dimensions or alternatively enables a reduction of the engine dimensions, that is to say enables a comparable power to be achieved with a smaller and lighter engine.

During the operation of a turbocharger, the shaft rotates with increasing engine rotational speed at high rotational velocity. As a result of the high rotational velocity, vibrations which for example are caused by the rotation of the shaft are transmitted to the bearing and its individual components. In order to minimize as far as possible an unwanted contact of the bearing cartridge with the bearing housing during this and to ensure a trouble-free operation of a turbocharger, use is customarily made of bearing units which by means of a so-called trapped oil film can damp the occurring vibrations.

A bearing device for a turbocharger is known from DE 35 31 313 A1. The bearing device comprises a bearing cartridge with a bearing which is designed as a ball bearing. The bearing is accommodated in a bush which in turn is positioned in a bearing housing. Recesses are introduced in the outer circumferential surface of the bush and also in the inner circumferential surface of the bearing housing and together form a hole. For the positioning of the bush inside the bearing housing, provision is made for a locking element, designed as a pin, which is inserted loosely into the recesses or into the hole.

As a result of the aforesaid design, a rotation of the outer bearing ring of the inserted bearing can certainly be prevented even at high rotational speeds of the shaft, but the use of a multiplicity of necessary separate bearing components and the cost intensive assembly effort which is associated therewith do not constitute a permanent solution for a bearing arrangement or for a turbocharger.

SUMMARY OF THE INVENTION

It is an object of the invention to provide a bearing unit for a turbocharger which is improved compared with the prior art and which with an inexpensive and simple production enables a secure positioning of the bearing and therefore a secure support of a shaft in a turbocharger.

The present invention provides a bearing unit for a turbocharger, comprising a bearing housing, extending in an axial direction, and a bearing cartridge which is arranged inside the bearing housing, wherein an interspace with an oil film is formed between the outer circumference of the bearing cartridge and the bearing housing, and wherein the bearing housing has a supply hole which is designed for the oil supply of the oil film. In this case, it is provided that the bearing cartridge comprises an anti-friction bearing, the outer cartridge ring of which is supported in the oil film in a freely rotatable manner.

The invention takes into consideration the fact that the use of anti-rotation devices, for example in the form of separate locking elements, do not permanently satisfy the economical demands for the further development of turbo-bearings or their bearing units on account of the additional costs and the increased assembly effort. In addition, the frictional moment, which is caused as a result of the friction during the rotation of a shaft during the operation of a turbocharger, is transmitted to the outer cartridge ring which is supported on the bearing housing via the locking elements or the anti-rotation device. The anti-rotation device therefore transmits the so-called structure-borne noise, which has a negative effect upon the components of the bearing arrangement. Overall, the self-centering of the bearing cartridge inside the bearing housing is impaired as a result of this, which in turn results in an unwanted contact between the individual components of the bearing unit.

The invention correspondingly recognizes that dispensing with an anti-rotation device or locking elements can basically provide an opportunity for preventing the transmission of torque or structure-borne noise to the bearing housing. In this case, it is basically to be taken into consideration, however, that an unsecured bearing cartridge or an unsecured outer cartridge ring acts like a plain bearing in which high frictional moment occurs between the individual components. The frictional moment is correspondingly transmitted from the shaft onto the outer cartridge ring and from this onto the bearing housing so that in this case also the required self-centering of the bearing cartridge inside the bearing housing cannot be ensured.

Taking into consideration the aforesaid, the invention finally recognizes that this problem can then be eliminated in a surprisingly simple manner if the bearing cartridge comprises an anti-friction bearing, the outer cartridge ring of which is supported in the oil film in a freely rotatable manner.

In other words, the outer cartridge ring is supported on the housing via the oil film so that the use of an anti-rotation device can be dispensed with.

As a result of the combination of an anti-friction bearing with an outer cartridge ring which is supported in the oil film, a lock-free support of the bearing cartridge or of the outer cartridge ring becomes possible. The oil film serves for the support of the outer bearing ring and absorbs the rotational moment which is transmitted from the shaft onto the outer cartridge ring. The vibrations of the outer cartridge ring are therefore damped by means of the oil film so that there is no fear of any contact with the bearing housing. A correspondingly contact-related wear of the individual bearing components can be excluded at this point.

The lock-free or anti-rotation device-free support of the outer cartridge ring in the oil film is therefore enabled as a result of the combination of an anti-friction bearing with the vibration-damping oil film. The rotational moment which is transmitted in an anti-friction bearing is absorbed by the oil film and transmission of the rotational moment onto the bearing housing can be overcome. Thus, the self-centering can also be maintained and contact between the individual bearing components can be prevented.

Overall, the outer cartridge ring, as a result of the freely rotatable support in the oil film, that is to say as a result of the support on the bearing housing via the vibration-damping oil film, also by dispensing with a separate anti-rotation device, is positioned in such a way that a reliable functioning of the turbocharger is ensured.

The oil film, in which the outer bearing ring is rotatably supported, depending upon the design of the bearing arrangement, has a corresponding thickness, or the interspace with the oil film has the necessary width. The size of the respective components as well as the dimensions of the interspace for the oil film, for example, are to be taken into consideration in this case. Furthermore, the density and the viscosity of the oil are also to be taken into consideration.

The anti-friction bearing serves in the present case especially for the secure support of the shaft, wherein it absorbs the radial and axial forces and at the same time enables the rotation of the shaft. An anti-friction bearing generally consists of two bearing rings with integrated running tracks. Rolling bodies, which roll on the running tracks, are arranged between the bearing rings. As rolling bodies, common bearing types, for example balls, cylindrical rollers, needle rollers or tapered rollers, can be used, depending upon requirement. In this case, either a design with a cage which guides the rolling bodies, or, for example, even a fully spherical variant without a cage, is possible.

With regard to the loads of the bearing unit during operation of a turbocharger, the bearing rings are produced especially from temperature-resistant and corrosion-resistant materials. Both the inner bearing ring and the outer bearing ring can be produced in one part or in a multiple of parts.

The anti-friction bearing in the present case is part of the bearing cartridge. The bearing cartridge, for example in addition to or alternatively to the anti-friction bearing, may comprise a carrier ring in which the anti-friction bearing is arranged with the outer cartridge ring. As a result of this, it becomes possible to design the bearing cartridge with flexibility according to the respective requirement and to preassemble it according to the client's wishes, for example.

The outer cartridge ring can be designed in this case as an outer bearing ring or as a carrier ring, for example.

Alternatively, the bearing cartridge can comprise both an outer bearing ring and an outer cartridge ring which is designed as a carrier ring. In this case, there is basically the possibility that in addition to the oil film which is formed between the outer circumference of the carrier ring and the inner circumference of the bearing housing, an oil film is additionally formed between the outer circumference of the outer bearing ring and the inner circumference of the carrier ring. In the case of such a design, both the outer bearing ring and the carrier ring can then be supported in the oil film in a freely rotatable manner.

The bearing housing, in which the bearing cartridge is arranged, can be produced from different materials. On account of the high loads during operation of a turbocharger, temperature-resistant and corrosion-resistant metal materials are especially suitable in this case. The bearing housing is especially designed with a locating hole for the bearing, wherein the inside diameter of the locating hole is slightly larger than the outside diameter of the bearing cartridge. The interspace and the oil film, which is formed in this, between the bearing cartridge and the bearing housing are correspondingly determined by the dimensions of the locating hole and of the outer cartridge ring.

The supply hole in the bearing housing serves for the oil supply of the interspace. Via the supply hole, oil is pushed from the engine oil circuit into the interspace between the inner circumference of the bearing housing and the outer circumference of the bearing cartridge so that the required oil film for a lock-free support of the outer cartridge ring in the bearing housing is enabled. The number of supply holes is basically not limited in this case.

Correspondingly more supply holes, which are provided for the supply of the oil film, are preferably formed in the bearing housing. The supply holes in this case are expediently introduced into the bearing housing at a sufficient axial distance apart so that a uniform distribution of the oil over the entire circumference of the outer cartridge ring is ensured.

The diameter of the supply hole is expediently adapted to the oil pressure and to the quantity of oil which is required for the forming of the oil film. The quantity of oil in this case is especially dependent upon the size of the interspace which in turn is predetermined by the ratio between the outside diameter of the bearing cartridge and the inside diameter of the bearing housing. The length of the supply hole is expediently adapted to the dimensions of the bearing housing. The supply hole in this case can be oriented inside the bearing housing either vertically to the bearing housing axis or can be inclined in relation to the bearing housing axis.

Basically, it is also possible to connect the supply hole with a so-called pressure distribution chamber. The pressure distribution chamber serves as an accumulator and can be supplied with oil via the supply hole so that the oil is pushed from the pressure distribution chamber into the interspace on the outer circumference of the outer cartridge ring.

In an advantageous embodiment of the invention, the supply hole is connected in a communicating manner to a groove which encompasses the bearing cartridge in the circumferential direction. The oil, which is pushed through the supply hole into the bearing housing, can be distributed from the groove both in the axial direction and over the circumference of the bearing cartridge in such a way that a uniform oil film is formed between the bearing cartridge and the inner wall of the bearing housing. As a result of this, the reliable and contact-free support of the outer cartridge ring is made possible.

In particular, a multiplicity of grooves can also be formed on the bearing cartridge and connected in a communicating manner to a multiplicity of supply holes in the bearing housing so that the supply of the oil film can be carried out at a plurality of points at the same time.

The outer cartridge ring preferably comprises a multiplicity of holes for drainage of oil. The holes expediently extend radially outward in the installed state of the outer cartridge ring and enable the drainage of oil from the anti-friction bearing even with a rotating outer cartridge ring. As a result of a multiplicity of holes, flooding of the bearing can be excluded regardless of the position of the outer cartridge ring.

The number of holes, and that of the oil drainage holes, are variable in dependence upon the axial length of the outer cartridge ring.

The outer cartridge ring is advantageously constructed in two parts, wherein the two ring parts of the outer cartridge ring are axially spaced apart. A two-part design enables a simple production of the ring parts and reduces the assembly cost of the bearing unit. Furthermore, both the costs and the transporting expenditure can be reduced. The axial spacing can be achieved by means of a spring element, for example, which is positioned between the two ring parts. The spring element forces the two ring parts apart and so keeps them in the intended position by spring action. The axial spacing of the ring parts in relation to each other is especially provided in this case by means of the pretension of the spring element. The spring element can be designed as a metal spiral spring, for example.

The outer cartridge ring is preferably supported inside the bearing cartridge in a floating manner, that is to say in an axially movable manner. In other words, the outer cartridge ring inside the bearing cartridge has a certain axial clearance. In the case of a floating support of the outer cartridge ring, a shaft can be displaced in relation to the bearing housing by the axial clearance, for example. The axial clearance is fixed in this case in dependence upon the required guiding accuracy so that the anti-friction bearings are not axially distorted even in the case of unfavorable thermal conditions. For the floating arrangement, deep-groove ball bearings, self-aligning ball bearings, or self-aligning roller bearings, for example, are conceivable as suitable types of bearing construction. Even with a certain desired axial clearance, it also necessary in this case that a reliable support of the outer cartridge ring in the region of the clearance naturally also has to continue to be ensured.

For the axial securing of the outer cartridge ring, at least one locking element is expediently included. The locking element serves as an axial end stop and so prevents an unwanted axial slipping of the outer cartridge ring inside the bearing housing. The locking element can basically have different shapes and sizes and either be connected to the bearing housing, in manner fixed to the housing, or be positioned in holes which are formed inside the bearing housing. The locking element can be designed as a locking plate, for example, which is attached on the end face of the bearing housing in a manner fixed to the housing.

Furthermore, bolts, pins or spigots, which for example are formed with a section for engaging in a recess or a hole inside the bearing housing, can also be used as a locking element.

In the case of a two-part construction of the outer cartridge ring, that is to say when this comprises two ring parts, so-called spring rings or piston rings can also be used as locking elements, for example. These spring rings or piston rings can be positioned in grooves inside the bearing housing, for example. The grooves, depending upon the design of the outer cartridge ring, can be introduced in this case either in the outer bearing ring, in the carrier ring, or even in both.

The outer cartridge ring preferably comprises a splash-oil hole for applying lubricant to the bearing. The oil in this case is pushed from the grooves, which encompass the bearing cartridge in the circumferential direction, into the interior of the bearing and so can also be used for example for lubrication and cooling of the bearing components there.

In an advantageous embodiment of the invention, the outer cartridge ring is designed as an outer bearing ring. For the guiding of rolling bodies, the outer bearing ring preferably has a rolling-body running track on the inner circumference.

The oil film is then formed between the outer circumference of the outer bearing ring and the inner circumference of the bearing housing.

The bearing cartridge preferably comprises a carrier ring with a hole which is connected in a communicating manner to the splash-oil hole via the groove which encompasses the outer cartridge ring on its outer circumference. The hole is expediently connected to the supply hole inside the bearing housing and so enables the dosing of oil from the engine's oil circuit right up to the splash-oil hole. As a result of the hole in the carrier ring, when it is used, for one thing the forming of the oil film in the interspace and also an adequate bearing lubrication and cooling of the bearing components is therefore also ensured.

When using a carrier ring and an outer bearing ring as part of the bearing cartridge, as already mentioned in the introduction, in addition to the oil film between the outer circumference of the outer bearing ring and the inner circumference of the carrier ring, an oil film can also be formed between the outer circumference of the carrier ring and the inner circumference of the bearing housing so that the carrier ring is positioned in the bearing housing in a freely rotatable manner and the outer bearing ring is positioned inside the carrier ring in a freely rotatable manner. The interspaces and therefore the oil films are expediently matched to each other in this case with regard to their depth.

In this case, in addition to the hole, provision can be made in the carrier ring for an additional groove, for example, which is connected to the hole in each case. Via this groove, an oil film can also be formed between the carrier ring and the bearing housing. The groove encompasses the carrier ring preferably in the circumferential direction so that the oil, which is pushed through the supply hole into the bearing housing, can be distributed from the groove both in the axial direction and over the circumference of the carrier ring. In this way, when using a carrier ring, a uniform oil film can also be ensured between this and the inner wall of the bearing housing.

The bearing housing expediently comprises an oil drainage hole. This oil drainage hole can be connected in a communicating manner to an oil drainage groove which is introduced on the outer circumference of the outer cartridge ring so that the oil which is fed via the supply hole to the interspace can drain off continuously.

Naturally, further embodiments of the bearing arrangement, which enable the use of an anti-friction bearing without an additional anti-rotation device, can be covered.

For example, there is also the possibility that the shaft which is to be supported comprises a rolling-body running track for the guiding of the rolling bodies. In the case of such an embodiment, the shaft itself undertakes the function of the inner bearing ring of the anti-friction bearing so that the use of inner bearing rings which are to be installed separately can be dispensed with and the expenditure and assembly cost during the production of these can be reduced.

A second object of the invention is achieved according to the invention by means of a bearing unit for a turbocharger, comprising a bearing housing, extending in an axial direction, and a bearing cartridge, having an outer bearing ring and a carrier ring, which is arranged inside the bearing housing, wherein an interspace with a vibration-damping oil film is formed between the outer circumference of the outer bearing ring and the carrier ring, and wherein the bearing housing has a supply hole which is designed for the oil supply of the oil film. In this case, it is also provided that the bearing cartridge comprises an anti-friction bearing, the outer bearing ring of which is supported in the oil film in a freely rotatable manner.

In other words, the outer bearing ring is also supported on the bearing housing via the oil film in the case of such an embodiment.

The carrier ring can basically be positioned in the bearing housing in a rotation-resistant manner or in a freely rotatable manner.

In the case of a rotation-resistant arrangement, the carrier ring can be fixed in the bearing housing in a frictionally locking or form-fitting manner, for example. In the case of such an embodiment, the interspace for the lock-free support of the outer cartridge ring in a vibration-damping oil film is correspondingly formed between the inner circumference of the carrier ring and the outer circumference of the outer bearing ring of the anti-friction bearing.

In the case of the freely rotatable design of the carrier ring, the bearing unit additionally has an interspace with a vibration-damping oil film between the carrier ring and the bearing housing, in which the carrier ring can be supported in a freely rotatable manner. The interspaces between the individual components of the bearing unit and therefore also the thickness of the oil film are preferably matched to each other.

Further advantageous embodiments feature in the claims which are directed towards the first bearing unit and which can correspondingly be transferred to the second bearing unit.

BRIEF DESCRIPTION OF THE DRAWINGS

In the following text, the invention is explained with reference to a drawing. In this case, in the drawing.

DETAILED DESCRIPTION

Figure 1:
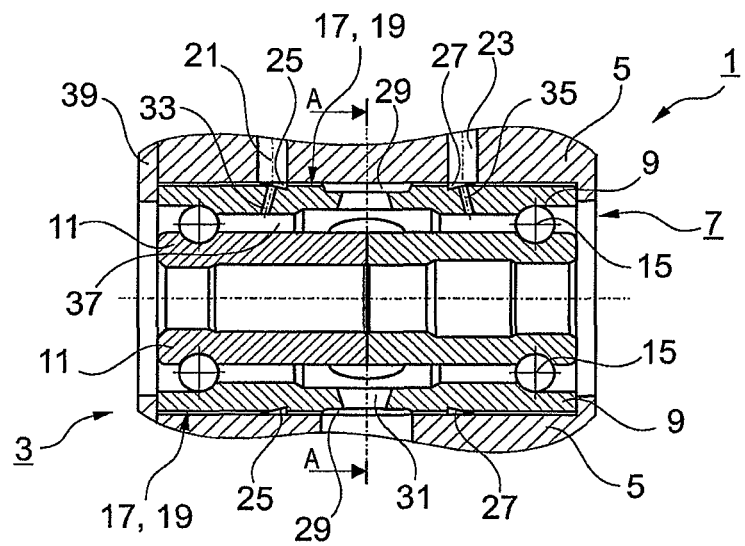
FIG. 1 shows in a longitudinal section a bearing unit for a turbocharger with an outer bearing ring supported in a floating manner.

FIG. 1 shows in a longitudinal section a bearing unit 1 for a turbocharger. The bearing unit 1 comprises a bearing cartridge 3 which is arranged in an axially extending metal bearing housing 5. As part of the bearing cartridge 3, an anti-friction bearing 7 is positioned in this. The bearing 7 is designed with an outer cartridge ring 9, which is designed as an outer bearing ring, and also with an inner bearing ring 11. The inner bearing ring 11 is constructed in two parts and in the installed state is arranged on a shaft, which is not shown in the present case. As rolling bodies 15, balls are installed between the bearing rings 9, 11, wherein in the present case a cage is not provided.

An interspace 17 with an oil film 19 is formed between the outer circumference of the outer bearing ring 9 and the bearing housing 5. The interspace 17 or the oil film 19 is supplied with oil via two supply holes 21, 23 in the installed state. To this end, both supply holes 21, 23 are connected in a communicating manner to grooves 25, 27 which encompass the outer bearing ring 9 on its outer circumference in each case. From the grooves 25, 27, the oil can be distributed both in the axial direction and over the circumference of the bearing cartridge 3 in such a way that a uniform oil film 19 is formed in the interspace 17 between the bearing cartridge 3 and the inner wall of the bearing housing 5.

The interspace 17 is of such width in the present case that the oil film 19 enables an adequate thickness for vibration insulation between the outer cartridge ring 9 and the bearing housing 5. Overall, by using the anti-friction bearing 7, a lower friction moment is transmitted than in the case of a plain bearing so that a separate anti-rotation device can be dispensed with.

Furthermore, the outer bearing ring 9 is provided with an oil drainage groove 29 on its outer circumference, via which the oil of the oil film 19 can drain off. In the installed state of the bearing 7, the oil drainage groove 29 is connected in a communicating manner to an oil drainage hole 31, the diameter of which is dimensioned so that a problem-free drainage of oil is ensured. In this way, a constant oil film 19 can be ensured. In addition, the oil also drains off in the axial direction outwardly between the outer bearing ring 9 and the bearing housing 5.

In addition, the oil is pushed from the grooves 25, 27 in the outer bearing ring 9 into the bearing interior 37 via two splash-oil holes 33, 35 and is made available for lubrication and cooling of the bearing components.

The axial locking of the outer bearing ring 9 is realized in the present case by the contact of its end faces on mating faces which are fixed on the housing in each case. To this end, a locking plate 39, fixed to the housing, is arranged on the end face of the bearing housing 5. The outer bearing ring 9 has an axial clearance and can rotate inside the bearing housing 5 if the frictional moment of the anti-friction bearing drives this during operation. If, in this case, in the installed state an axial force occurs on the shaft, then the outer bearing ring 9, depending on the axial force direction, is supported in the axial direction on the locking plate 39 or on the bearing housing 5.

The overall resistance of the outer bearing ring 9 increases in comparison to the resistance during axial force-free operation. In this case, the hydrodynamic load-bearing percentage of the oil film 19 is established in dependence upon the rotational speed.

In order to ensure the central oil drainage from the anti-friction bearing 7 via the oil drainage hole 31 even with a rotating outer bearing ring 9 and therefore to exclude flooding of the bearing 7, radially extending holes are introduced in the axially center region of the outer bearing ring but are not visible on account of the view. They can be gathered from FIG. 2, however. By means of the holes, the necessary drainage of oil can be ensured in any position of the outer bearing ring 9.

Figure 2:
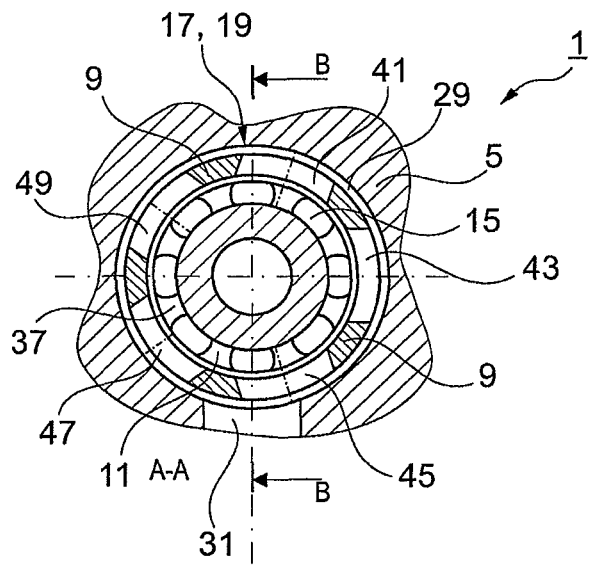
FIG. 2 shows in a top view the bearing unit according to FIG. 1.

FIG. 2 shows in a top view the bearing unit 1 according to FIG. 1. With the aid of this view, the interspace 17 which encompasses the outer circumference of the outer bearing ring 9 is clearly visible. The supply holes 21, 23 for the supply of the interspace 17, and also the grooves 25, 27 which encompass the outer bearing ring 9 on its outer circumference are not all visible in the present case on account of the view.

However, five radially extending holes 41, 43, 45, 47, 49, which are introduced into the outer bearing ring 9, are clearly visible here. As a result of this, as already described above, the central oil drainage from the anti-friction bearing 7 via the oil drainage hole 31 is enabled regardless of the positioning of the outer bearing ring 9 in the interspace 17. The number of oil drainage holes can correspondingly be adapted to requirements in this case so that even more oil drainage holes are possible.

For the further description of the individual bearing components of the bearing unit 1, reference is made at this point to the detailed description in FIG. 1.

Figure 3:
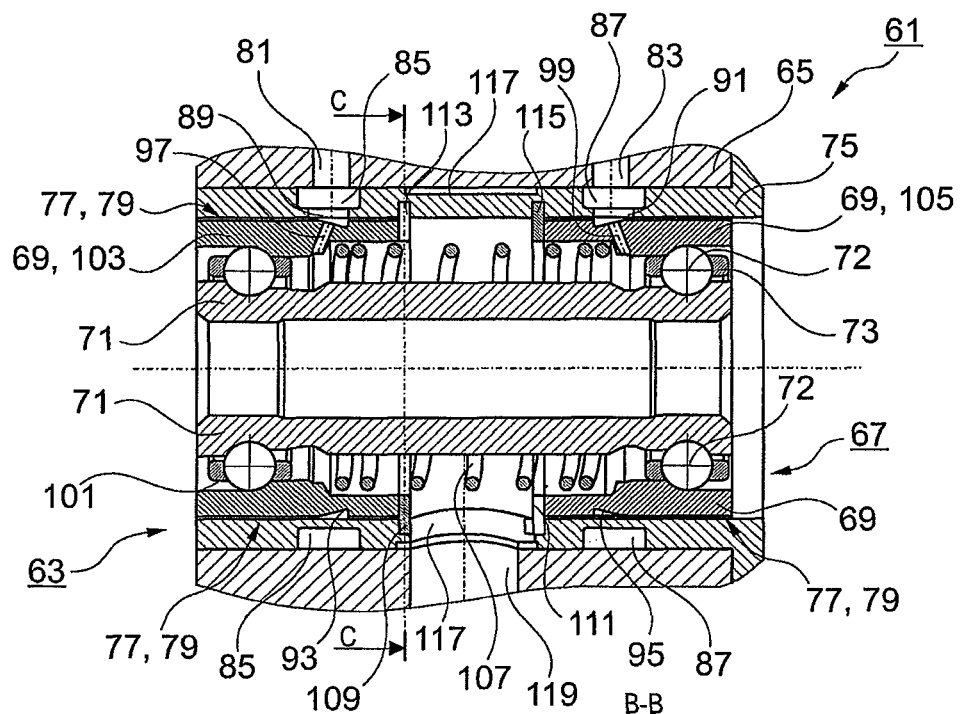
FIG. 3 shows in a longitudinal section a further bearing unit for a turbocharger with an outer bearing ring supported in a floating manner and also a carrier ring.

FIG. 3 shows in a longitudinal section a further bearing unit 61 for a turbocharger. The bearing unit 61 comprises a bearing cartridge 63 which is arranged in an axially extending metal bearing housing 65. As part of the bearing cartridge 63, an anti-friction bearing 67 is positioned in this. The bearing 67 is designed with an outer cartridge ring 69, which is designed as an outer bearing ring, and also an inner bearing ring 71, wherein as rolling bodies 72 balls are installed between the bearing rings 69, 71. The balls are guided in a cage 73. The inner bearing ring 71 is constructed in one part and in the installed state is arranged on a shaft. The shaft is not shown in the present case.

In contrast to FIGS. 1 and 2, the bearing cartridge 63 comprises a carrier ring 75. The carrier ring 75 is arranged inside the bearing housing 65 in a manner fixed to said housing. The bearing 67 is arranged inside the carrier ring 75 so that the interspace 77 with the oil film 79, which is provided for the lock-free support of the outer bearing ring 69 is correspondingly formed in the present case between the inner circumference of the carrier ring 75 and the outer circumference of the outer bearing ring 69. The outer bearing ring 69 is therefore supported in a floating manner inside the bearing cartridge 63 without the use of locking elements.

The interspace 77 or the oil film 79, according to FIG. 3, is also supplied with oil via two supply holes 81, 83 in the bearing housing 65. The supply holes 81, 83 are connected in this case to grooves 85, 87 in each case which are introduced in the carrier ring 75. The grooves 85, 87 open into holes 89, 91 in each case which are introduced in the carrier ring 75 on the inner circumference of this. The holes 89, 91 in turn open into the grooves 93, 95 which encompass the outer circumference of the outer bearing ring 69. As a result of this, admission of oil into the interspace 77 and therefore the floating support of the outer bearing ring 69 are ensured.

In addition, the grooves 93, 95 in the outer bearing ring are connected to two splash-oil holes 97, 99 so that the oil is pushed from the grooves 93, 95 into the bearing interior 101 and so can be used for lubrication and cooling of the bearing components.

A further difference to FIGS. 1 and 2 lies in the design of the outer bearing ring 69. This is designed in two parts in the present case and correspondingly consists of two axially spaced apart ring parts 103, 105. The axial spacing is achieved in this case by means of a spring element 107 which is designed as a metal spiral spring. The spring element 107 forces the two ring parts 103, 105 apart and so keeps them in the intended position by spring action. The axial distance of the ring parts 103, 105 from each other is provided in this case by the pretension of the spring element 107.

In addition, the axial locking of the ring parts 103, 105 is achieved two locking elements 109, 111. The locking elements 109, 111 are designed as spring rings which are arranged on the circumference of the carrier ring 75. The carrier ring 75 in this case has grooves 113, 115 in which the spring rings 109, 111 engage. The ring parts 103, 105 of the outer bearing ring 69, in the event of an axial force acting upon the supported mounted shaft, are supported in the axial direction on the spring rings 109, 111 and so prevent an unwanted axial slipping of the ring parts 103, 105 inside the carrier ring 75. Furthermore, the spring rings 109, 111 serve as a transporting lock for the carrier ring 75.

The floating support of the outer bearing ring 69 or of the ring parts 103, 105 is basically dependent upon a certain clearance. The clearance in this case is dependent upon the temperature. The bearing arrangement 61 is correspondingly designed so that adequate clearance is provided at each temperature.

Via the oil drain 117 provided, oil can drain off from the interspace 77. The oil drain 1179 is connected in a communicating manner to an oil drainage hole 119 of the bearing housing 65 in the installed state of the bearing 67.

Figure 4:
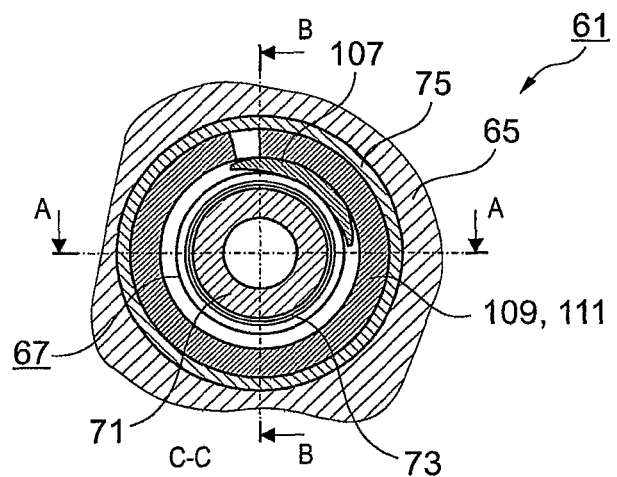
FIG. 4 shows in a top view the bearing unit according to FIG. 3.

In FIG. 4, the bearing unit 61 according to FIG. 3 is to be seen in a top view. The positioning of the carrier ring 75, in a manner fixed to the housing, is clearly seen in the present case. The bearing 67 is arranged inside the carrier ring 75 accordingly. The interspace 77 with the vibration-damping oil film 79, which is designed for the lock-free support of the outer bearing ring 69, is formed between the inner circumference of the carrier ring 75 and the outer circumference of the outer bearing ring 69, wherein this is not visible on account of the view. Instead, the spring element 107, which serves for the axial spacing of the ring parts 103, 105 of the outer bearing ring 69, is visible. The ring parts 103, 105 are not shown either in the present case.

For the further description of the individual bearing components of the bearing unit 61 reference is made at this point to the detailed description in FIG. 3.

Figure 5:
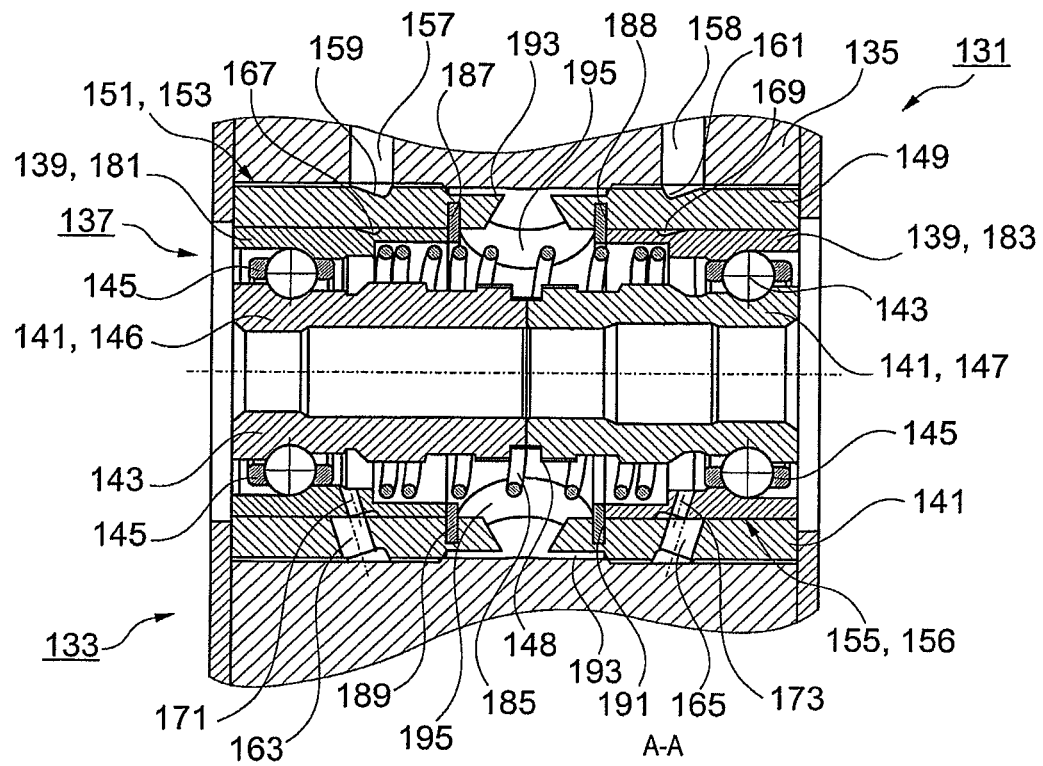
FIG. 5 shows in a longitudinal section a further bearing unit for a turbocharger with an outer bearing ring supported in a floating manner and also a carrier ring.

In FIG. 5, a further bearing unit 131 for a turbocharger is shown in a longitudinal section. As in FIGS. 3 and 4 also, the bearing unit 131 comprises a bearing cartridge 133 which is arranged in an axially extending metal bearing housing 135. The bearing cartridge 133 comprises an anti-friction bearing 137 with an outer bearing ring 139 and with an inner bearing ring 141, wherein the inner bearing ring 141 is arranged on a shaft in the installed state. A shaft is not shown, however, in the present case.

As rolling bodies 143, balls, which are arranged in a cage 145, are guided between the bearing rings 139, 141. The inner bearing ring 141 is furthermore designed in two parts, wherein the two ring parts 146, 147 of the inner bearing ring 141 are fastened to each other by means of a locking element 148 which is designed as a locking clip. The locking element 148 serves equally as a transporting lock.

Furthermore, the bearing cartridge 133 comprises a carrier ring 149 in which the bearing 137 is arranged. In contrast to FIGS. 3 and 4, the carrier ring 149 in the present case is arranged inside the bearing housing 135 in a manner not fixed to the housing, however, but arranged in a freely rotatable manner in relation to this. Therefore, a first interspace 151 with an oil film 153 is formed between the outer circumference of the carrier ring 149 and the inner circumference of the bearing housing 135.

The outer bearing ring 139 of the bearing 137 is again supported inside the carrier ring 149 in a floating manner and without locking elements for rotation prevention. An interspace 155 with an oil film 156 is therefore also provided between the outer bearing ring 139 and the carrier ring 149. Accordingly, the outer bearing ring 139 is rotatably supported relative to the carrier ring 149 and the carrier ring 149 is rotatably supported relative to the bearing housing 135. Also in the case of this embodiment, locking elements for rotation prevention can be completely dispensed.

Both the interspace 151 with the oil film 153 and the interspace 155 with an oil film 156 are supplied with oil via two supply holes 157, 158 in the bearing housing 135 which are connected in a communicating manner in each case to holes 163, 165 via grooves 159, 161 which are introduced in the carrier ring 149. From the holes 163, 165, oil can spread out in the interspace 151 between the bearing housing 135 and the carrier ring 149 so that the vibration-damping oil film 153 is created there.

Both vibration-damping oil films 153, 156 are matched to each other with regard to their thickness so that a support is possible without the use of locking elements, that is to say lock-free.

Furthermore, the holes 163, 165 in the outer bearing ring 139 open into grooves 167, 169 which encompass the outer bearing ring 139 on its outer circumference. As a result of this, an admission of oil into the interspace 155 and therefore the floating support of the outer bearing ring 139 are ensured.

In addition, the grooves 167, 169 in the outer bearing ring 139 are connected to two splash-oil holes 171, 173 so that the oil can be pushed into the bearing interior 175 and can be used for lubrication of the bearing components.

The outer bearing ring 139 is designed in two parts and, as in FIGS. 3 and 4 also, consists of two axially spaced apart ring parts 181, 183. For the axial spacing, use is made of a spring element 185 which is designed as a metal spiral spring and which by means of its pretension forces the two ring parts 181, 183 apart.

As an axial end stop for the two ring parts 181, 183, two locking elements 187, 188, which are designed as spring rings, are attached on the inner circumference of the carrier ring 149. The ring parts 181, 183 in this case engage in grooves 189, 191 of the carrier ring 149. In addition to their function as an axial locking device, the spring rings 187, 188 also serve as a transporting lock for the carrier ring 149.

In order to enable drainage of oil, the carrier ring 149 has an oil drainage groove 193 on its outer circumference which is connected in a communicating manner to the oil drainage hole 195. In the present case, the carrier ring 149 has radially extending oil drainage holes in this case in order to also be able to exclude flooding of the bearing 137 during a rotation of the bearing components. Not all the holes are visible on account of the sectioned view.

Figure 6:
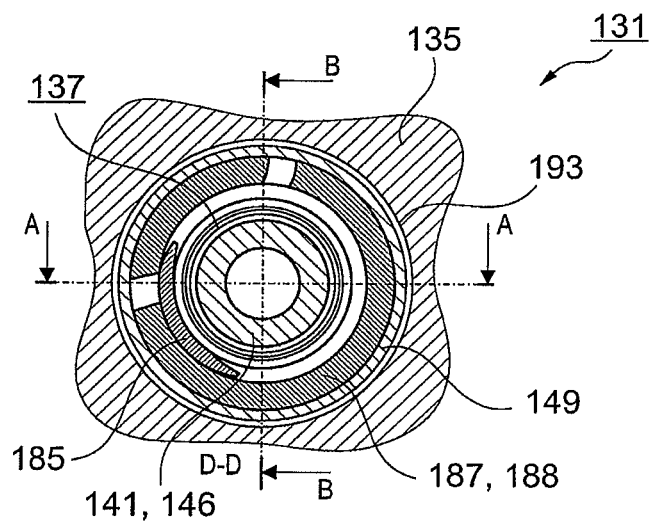
FIG. 6 shows in top view the bearing unit according to FIG. 5.

In FIG. 6, the bearing unit 131 according to FIG. 5 is to be seen in a top view. The carrier ring 149, which is supported inside the bearing housing 135, is visible. The carrier ring 149, in contrast to FIG. 4, is not supported in the interspace 151 in a manner fixed to the housing, but in a rotatable manner, which, however, is not visible on account of the view. However, also visible here, as in FIG. 4, is the spring element 185 which serves for the axial spacing of the ring parts 181, 183, which are not shown, of the outer bearing ring 139.

For the further description of the individual bearing components of the bearing unit 131, reference is correspondingly made at this point to the detailed description in FIG. 5.

Figure 7:
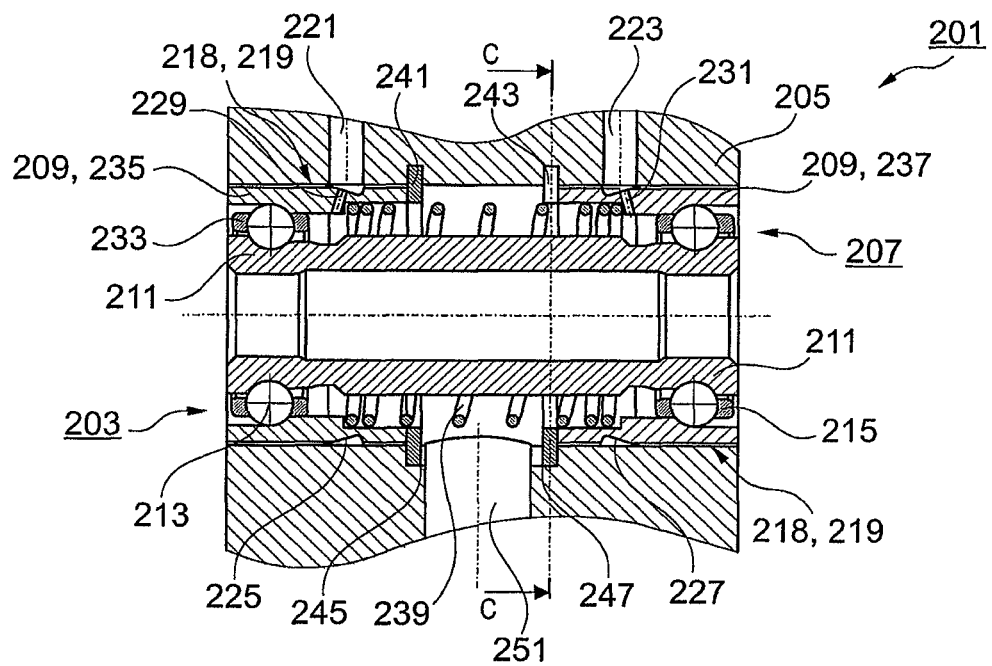
FIG. 7 shows in a longitudinal section a further bearing unit for a turbocharger with an outer bearing ring supported in a floating manner.

FIG. 7 shows in a longitudinal section a further bearing unit 201 for a turbocharger. The bearing unit 201 basically corresponds to the embodiment of the bearing unit 61 according to FIGS. 3 and 4 so that reference can be made at this point to the detailed description there. The description and function of the individual components described there can correspondingly be transferred to the bearing unit 201.

The bearing unit 201 also comprises a bearing cartridge 203 which is arranged in an axially extending metal bearing housing 205. As part of the bearing cartridge 203, an anti-friction bearing 207 is positioned in this. The bearing 207 is designed with an outer bearing ring 209 and also with an inner bearing ring 211, wherein as rolling bodies 213 balls are installed between the bearing rings 209, 211. The balls 213 are guided in a cage 215. The inner bearing ring 211 is constructed in one part as well as being installed on a shaft in the installed state as in the already stipulated figures.

The difference to the bearing unit 61 according to FIGS. 3 and 4 lies in the fact that the bearing cartridge 203 of the bearing unit 201 does not include a carrier ring. The interspace 218 with the oil film 219, which is provided for the lock-free support of the outer bearing ring 209, is correspondingly formed in the present case between the inner circumference of the bearing housing 205 and the outer circumference of the outer bearing ring 209. The interspace 218 is also formed with an oil film 219 in the present case, which enables an adequate thickness for vibration insulation between the outer bearing ring 209 and the bearing housing 205. In this way, the outer bearing ring 209 can be supported inside the bearing cartridge 203 in a lock-free and floating manner, that is to say with an axial clearance.

Two supply holes 221, 223, which are introduced in the bearing housing 205 and are connected in a communicating manner in each case to grooves 225, 227 which encompass the outer bearing ring 209 on its outer circumference, serve for the supply of the oil film 219. From the grooves 225, 227, the oil can be distributed both in the axial direction and over the circumference of the bearing cartridge 3 in such a way that the oil film 219 is formed uniformly in the interspace 218.

The oil is additionally pushed from the grooves 225, 227 in the outer bearing ring 209 via two splash-oil holes 229, 231 into the bearing interior 233 and is available for lubrication of the bearing components.

The outer bearing ring 209 is also designed in two parts with two axially spaced apart ring parts 235, 237. For the axial spacing, use is made of a metal spiral spring 239 which forces the two rings parts 235, 237 apart and so keeps them if the intended position by spring action.

Furthermore, two locking elements 241, 243, which are designed as spring rings, are used for the axial locking of the ring parts 235, 237 and are arranged on the circumference of the bearing housing 205. For fastening of the locking elements 241, 243, the bearing housing 205 has two encompassing grooves 245, 247 in which the locking elements 241, 243 engage.

Furthermore, the outer bearing ring 209 is provided with an oil drain 249 on its outer circumference, via which the oil can drain from the interspace 227. The oil drain 249 in the installed state of the bearing 207 is connected in a communicating manner to an oil drainage hole 251.

Figure 8:
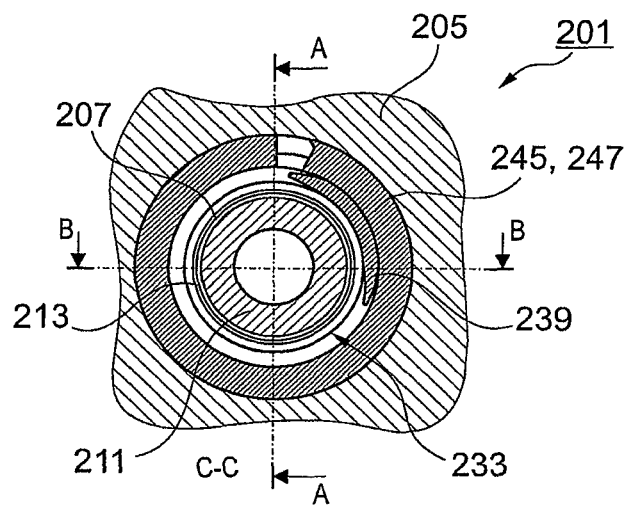
FIG. 8 shows in a top view the bearing unit according to FIG. 7.

In FIG. 8, the bearing unit 201 is shown in a top view. The supported rolling bodies 213, which are guided on the inner bearing ring 211, are clearly visible. Furthermore, also visible, in addition to the spring element 239, are the locking elements 241, 243 which are used for the axial locking of the ring parts 235, 237 of the outer bearing ring 209. The locking elements 241, 243 are arranged on the inner circumference of the bearing housing 205. The ring parts 235, 237 are not visible in the present case.

The further detailed description of the bearing unit 201 can be gathered from the description in relation to FIG. 7.

Figure 9:
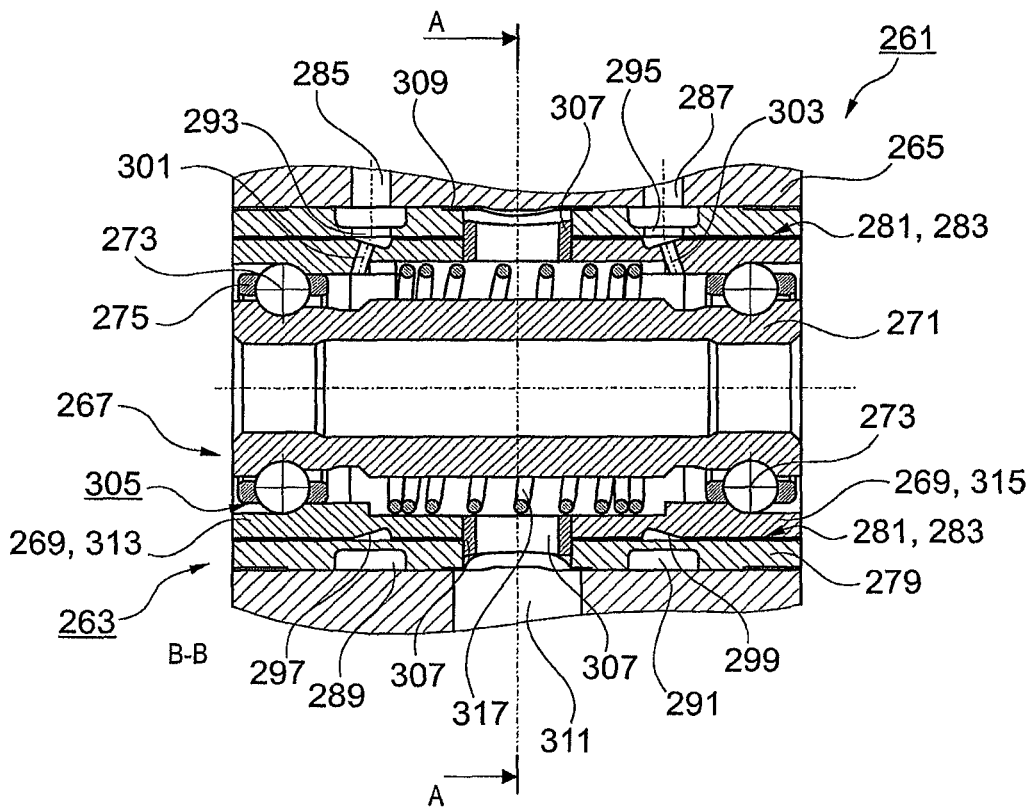
FIG. 9 shows in a longitudinal section a further bearing unit for a turbocharger with an outer bearing ring supported in a floating manner and also a carrier ring.

FIG. 9 shows in a longitudinal section a further bearing unit 261 for a turbocharger. The bearing unit 261 is designed in this case basically just like the bearing unit 61 according to FIGS. 3 and 4. Therefore, the description can be correspondingly transferred here also.

The bearing unit 261 comprises a bearing cartridge 263, with an anti-friction bearing 267, which is arranged in an axially extending metal bearing housing 265. The bearing 267 is designed with an outer bearing ring 269 and also an inner bearing ring 271, wherein balls are used as rolling bodies 273. The balls are guided in a cage 275. The inner bearing ring 271 is constructed in one part.

Furthermore, the bearing cartridge 263 comprises a carrier ring 279 which is arranged on the inner circumference of the bearing housing 265 in a manner fixed to the housing. The anti-friction bearing 267 is arranged in this case inside the carrier ring 279. For the lock-free and floating support of the outer bearing ring 269, the interspace 281 with the oil film 283 is correspondingly formed between the inner circumference of the carrier ring 279 and the outer circumference of the outer bearing ring 269.

The oil film 283 is supplied with oil via two supply holes 285, 287 in the bearing housing 265, wherein here also the supply holes 285, 287 are connected in each case to grooves 289, 291 which are introduced in the carrier ring 279. The grooves 289, 291 open in each case into holes 293, 295 on the inner circumference of the carrier ring 279. From the holes 293, 295, the oil is conveyed from the engine's oil circuit into two grooves 297, 299 which encompass the outer circumference of the outer bearing ring 269 so that an admission of oil into the interspace 281, or the forming of the oil film 283 and therefore the desired anti-rotation device-free support, is ensured.

In addition, here also the grooves 297, 299 of the outer bearing ring 269 are connected to two splash-oil holes 301, 303 so that the oil is pushed into the bearing interior 305 and can be used there for lubrication of the bearing components.

In contrast to FIGS. 3 and 4, in the present case the axial stop of the outer bearing ring 269 is achieved via two pins 307, fixed to the carrier ring, which are positioned equidistantly along the circumference of the bearing cartridge 263. By means of a multiplicity of pins 307, tilting can be prevented in the case of a floating outer ring 269, that is to say in the case of a clear axial clearance 269. In addition, the pins 307 serve as a transporting lock for the carrier ring 279.

The pins 307, which are fixed to the carrier ring, are designed as hollow bushes in the present case which project into the oil drainage groove 309 which is formed on the circumference of the carrier ring 279. The hollow design of the pins 307 enables an adequate drainage of oil. The oil drainage groove 309 is additionally connected in a communicating manner to an oil drainage hole 311 in the installed state of the bearing 267.

Furthermore, the outer bearing ring 269 is designed in two parts with two axially spaced apart ring parts 313, 315, the axial spacing of which, as in the previously described figures also, is achieved by means of a spring element 317 which is designed as a metal spiral spring.

Figure 10:
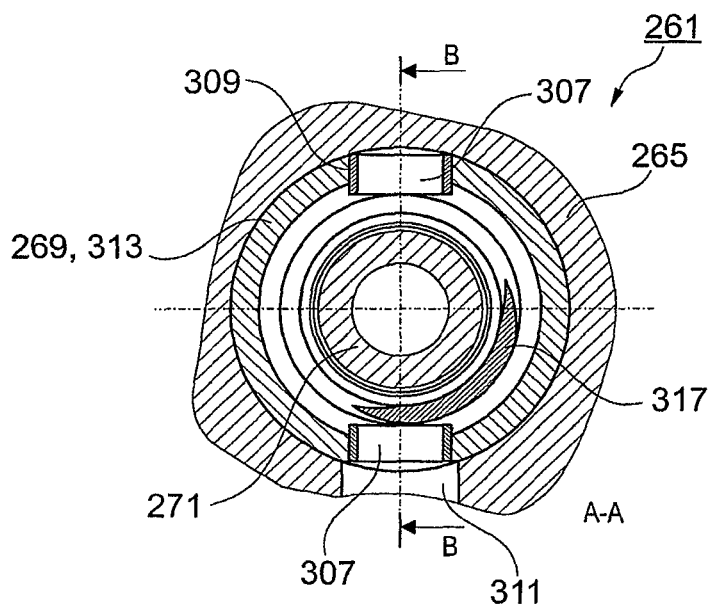
FIG. 10 shows in a top view the bearing unit according to FIG. 9.

FIG. 10 shows the bearing unit 261 in a top view. Two of the four pins 307, which are designed as hollow bushes, are visible here. The pins 307 are arranged opposite each other on the circumference on the bearing arrangement 261 and are fixedly connected to the carrier ring 279. The pins 307 prevent an unwanted axial displacement of the ring parts 313, 315 of the outer bearing ring 269 which are supported in a floating and lock-free manner.

In this case, it is to be taken into consideration that on account of the floating support of the ring parts 313, 315 a certain axial clearance between the locking elements, that is to say the pins 307, and the ring parts 313, 315 is naturally always established on account of the movement which is transmitted from a shaft. The axial clearance is fixed in this case in dependence upon the required guiding accuracy so that the anti-friction bearing 267 cannot be axially distorted even in the case of unfavorable thermal conditions.

The further detailed description of the bearing unit 261 can be gathered in the present case from the description in relation to FIG. 10.

LIST OF DESIGNATIONS

1 Bearing unit
3 Bearing cartridge
5 Bearing housing
7 Anti-friction bearing
9 Outer bearing ring
11 Inner bearing ring
15 Rolling bodies
17 Interspace
19 Oil film
21 Supply hole
23 Supply hole
25 Groove
27 Groove
29 Oil drainage groove
31 Oil drainage hole
33 Splash-oil hole
35 Splash-oil hole
37 Bearing interior
39 Locking plate
41 Hole
43 Hole
45 Hole
47 Hole
49 Hole
61 Bearing unit
63 Bearing cartridge
65 Bearing housing
67 Anti-friction bearing
69 Outer bearing ring
71 Inner bearing ring
72 Rolling bodies
73 Cage
75 Carrier ring
77 Interspace
79 Oil film
81 Supply hole
83 Supply hole
85 Groove
87 Groove
89 Hole
91 Hole
93 Groove
95 Groove
97 Splash-oil hole
99 Splash-oil hole
101 Bearing interior
103 Ring part
105 Ring part
107 Spring element
109 Locking element
111 Locking element
113 Groove
115 Groove
117 Oil drain
119 Oil drainage hole
131 Bearing unit
133 Bearing cartridge
135 Bearing housing 137 Anti-friction bearing
139 Outer bearing ring
141 Inner bearing ring
143 Rolling bodies
145 Cage
146 Ring part
147 Ring part
148 Locking element
149 Carrier ring
151 Interspace
153 Oil film
155 Interspace
156 Oil film
157 Supply hole
158 Supply hole
159 Groove
161 Groove
163 Hole
165 Hole
167 Groove
169 Groove
171 Splash-oil hole
173 Splash-oil hole
175 Bearing interior
181 Ring part
183 Ring part
185 Spring element
187 Locking element
188 Locking element
189 Groove
191 Groove
193 Oil drainage groove
195 Oil drainage hole
201 Bearing unit
203 Bearing cartridge
205 Bearing housing
207 Anti-friction bearing
209 Outer bearing ring
211 Inner bearing ring
213 Rolling bodies
215 Cage
218 Interspace
219 Oil film
221 Supply hole
223 Supply hole
225 Groove
227 Groove
229 Splash-oil hole
231 Splash-oil hole
233 Bearing interior
235 Ring part
237 Ring part
239 Spring element
241 Locking element
243 Locking element
245 Groove
247 Groove
249 Oil drain
251 Oil drainage hole
261 Bearing unit
263 Bearing cartridge
265 Bearing cartridge
267 Anti-friction bearing
269 Outer bearing ring
271 Inner bearing ring
273 Rolling bodies
275 Cage
279 Carrier ring
281 Interspace
283 Oil film
285 Supply hole
287 Supply hole
289 Groove
291 Groove
293 Hole
295 Hole
297 Groove
299 Groove
301 Splash-oil hole
303 Splash-oil hole
305 Bearing interior
307 Pins
309 Oil drainage groove
311 Oil drainage hole
313 Ring part
315 Ring part
317 Spring element

What is claimed is:

1. A bearing unit for a turbocharger, comprising:
a bearing housing extending in an axial direction; and
a bearing cartridge arranged inside the bearing housing, an interspace with an oil film being formed between the outer circumference of the bearing cartridge and the bearing housing, the bearing cartridge having an outer cartridge ring;
the bearing housing having a supply hole for oil supply of the oil film, the bearing cartridge including an anti-friction bearing, the outer cartridge ring being supported in the oil film in a freely rotatable manner,
wherein the outer cartridge ring comprises a multiplicity of drainage holes for drainage of oil.

2. The bearing unit as recited in claim 1 wherein the supply hole in the bearing housing communicates with a groove surrounding the bearing cartridge in a circumferential direction.

3. The bearing unit as recited in claim 1 wherein the outer cartridge ring is a two part structure including two ring parts axially spaced apart.

4. The bearing unit as recited in claim 1 further including at least one lock for axial locking of the outer cartridge ring.

5. The bearing unit as recited in claim 1 wherein the outer cartridge ring comprises a splash-oil hole for admission of lubricant into a bearing interior.

6. The bearing unit as recited in claim 5 wherein the bearing cartridge comprises a carrier ring with a carrier ring hole which, via a groove surrounding the outer cartridge ring on an outer circumference, is connected in a communicating manner to the splash-oil hole.

7. The bearing unit as recited in claim 1 wherein the outer cartridge ring is designed as an outer bearing ring.

8. The bearing unit as recited in claim 1 wherein the bearing housing comprises an oil drainage hole.

9. A bearing unit for a turbocharger, comprising:
a bearing housing extending in an axial direction; and
a bearing cartridge having an outer bearing ring and a carrier ring, the bearing cartridge being arranged inside the bearing housing, an interspace with a vibration-damping oil film being formed between an outer circumference of the outer bearing ring and the carrier ring,
the bearing housing having a supply hole for oil supply of the oil film, the bearing cartridge including an anti-friction bearing, the outer bearing ring supported in the oil film in a freely rotatable manner.

10. A bearing unit for a turbocharger, comprising:
a bearing housing extending in an axial direction; and
a bearing cartridge arranged inside the bearing housing, an interspace with an oil film being formed between the outer circumference of the bearing cartridge and the bearing housing, the bearing cartridge having an outer cartridge ring;
the bearing housing having a supply hole for oil supply of the oil film, the bearing cartridge including an anti-friction bearing, the outer cartridge ring being supported in the oil film in a freely rotatable manner, wherein the outer cartridge ring comprises a splash-oil hole for admission of lubricant into a bearing interior, the bearing cartridge comprises a carrier ring with a carrier ring hole which, via a groove surrounding the outer cartridge ring on an outer circumference, is connected in a communicating manner to the splash-oil hole.

* * * * *